(12) United States Patent
Nakashima

(10) Patent No.: US 6,829,774 B2
(45) Date of Patent: Dec. 7, 2004

(54) CARTRIDGE STORAGE DEVICE

(75) Inventor: Hiroshi Nakashima, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 113 days.

(21) Appl. No.: 10/257,964

(22) PCT Filed: Apr. 23, 2001

(86) PCT No.: PCT/JP01/03489

§ 371 (c)(1),
(2), (4) Date: Oct. 25, 2002

(87) PCT Pub. No.: WO01/84548

PCT Pub. Date: Nov. 8, 2001

(65) Prior Publication Data

US 2003/0103436 A1 Jun. 5, 2003

(30) Foreign Application Priority Data

Apr. 28, 2000 (JP) ........................................ 2000-129222
Sep. 11, 2000 (JP) ........................................ 2000-274276

(51) Int. Cl.⁷ .............................................. G11B 17/04
(52) U.S. Cl. ...................................... 720/640; 720/631
(58) Field of Search ................................. 720/630, 631, 720/632, 633, 634, 640; 369/75.1, 75.2, 77.1, 77.2; 360/99.02, 99.06

(56) References Cited

U.S. PATENT DOCUMENTS 5,088,085 A * 2/1992 Uehara ....................... 369/77.2
6,172,846 B1 * 1/2001 Ariyoshi ................... 360/99.06
6,188,542 B1 * 2/2001 Cheong ..................... 360/99.06

FOREIGN PATENT DOCUMENTS

JP          5-225743          9/1993

* cited by examiner

Primary Examiner—David L. Ometz
(74) Attorney, Agent, or Firm—Armstrong, Kratz, Quintos, Hanson & Brooks, LLP

(57) ABSTRACT

A device for accommodating a cartridge including a holder supported at one end thereof by a pivot on a chassis and positionable as inclined upward with respect to the chassis for the cartridge to be inserted thereinto. A fitting pin is provided on the chassis and is fittable into a positioning cutout formed in a front end portion of the cartridge and opened as at opening on a front side thereof. The fitting pin has a top end positioned below the path L of movement of the upper end of the opening when the cartridge is inserted into the holder and positioned above the point X of intersection of the fitting pin with the path M of movement of the lower surface of the cartridge.

3 Claims, 8 Drawing Sheets

CARTRIDGE STORAGE DEVICE

BACKGROUND OF THE INVENTION

1. Field of the Invention

The present invention relates to a device for accommodating a cartridge having enclosed therein a disk serving as a recording medium and, more particularly, to a disk recording or playback device.

2. Description of the Related Art

Cartridges having enclosed therein a disk serving as a recording medium are well-known. FIG. 4A is a plan view of a cartridge 6 previously proposed by the present applicant, and FIG. 4B is a side elevation of the same.

The proposed cartridge is designed for use in recording or playback devices of the superresolution type. A disk 60 is rotatably held within the cartridge 6 which is made from a synthetic resin, with a shutter 63 slidably provided on the upper wall of the cartridge 6 for alternatively exposing or closing the disk 60. The cartridge 6 has a positioning cutout 61, erroneous insertion preventing cavity 64 and fitting cavity 65 which are opened on the bottom side.

The shutter 63 is biased in a closing direction by a torsion spring 67 provided inside the cartridge 6. As shown in FIG. 4B, the torsion spring 67 is inserted into the cartridge 6 through an opening 66 formed in a side wall of the cartridge 6. The shutter 63 is usually closed to prevent dust from entering the cartridge and adhering to the disk 60.

FIG. 3 is a side elevation showing a disk recording or playback device for accommodating the cartridge 6. A holder 3 to be loaded with the cartridge 6 is supported at a base end thereof by pivots 32 on one end of a chassis 1 having a turntable 7 and a pickup 70 mounted thereon. The direction of insertion of the cartridge 6 is matched with the sliding direction of the shutter 63. The cartridge 6 is inserted into the holder 3 as it is raised, with its opening 66 facing toward the right.

Projecting inward from opposite side walls of the holder 3 are support plates 30, 30 for supporting the bottom of the cartridge 6. The holder 3 is provided inside thereof with a mechanism (not shown) for opening the shutter 63. A beam is projected from the pickup 70 onto the disk 60 as exposed by opening the shutter 63. In the following description, the direction in which the cartridge 6 is inserted into the holder 3 will be referred to as the "front," and the direction in which it is discharged therefrom as the "rear."

The chassis 1 is provided at its front and rear ends with a first fitting pin 5 and a second fitting pin 5a fittable into the positioning cutout 61 in the cartridge 6 and the fitting cavity 65 thereof, respectively. Each of the fitting pins 5, 5a comprises a solid cylindrical prop 50 for supporting the lower wall of the cartridge 6 and a conical guide 51 projecting from the top of the prop 50.

The positioning cutout 61 and the erroneous insertion preventing cavity 61 extend forward or rearward, and the cutout 61 has a width S slightly smaller than the diameter of lower end of the guide 51 (see FIG. 4A). The positioning cutout 61 is partly opened on the front side as indicated at 62.

When the cartridge 6 is inserted into the holder 3, the positioning cutout 61 fits around the guide 51 of the first fitting pin 5, whereby the cartridge 6 is prevented from producing backlash laterally of the holder. When the holder 3 is pivotally moved down, the cartridge 6 is placed on the top of the props 50. The disk 60 is placed on the turntable 7 for recording or reproduction of signals.

FIG. 5 is a plan view in section of the holder 3 as lowered, with the pivots 32, 32 for the holder 3 directed laterally. For the sake of convenience of description, the top wall of the holder 3 is not shown. FIG. 6 is a front view of the holder 3 as seen from the direction B in FIG. 5. The support plate 30 at right has a raised end to serve as a projection 31 for preventing misinsertion. The support plate 30 at left has an aperture 33 formed in a rear end portion thereof for the second fitting pin 5a to extend therethrough.

When the cartridge 6 is inserted into the holder 3, the misinsertion preventing projection 31 fits into the erroneous insertion preventing cavity 64. Should the cartridge 6 be inserted as turned upside down, the projection 31 fails to fit into the cavity 64, so that the cartridge 6 can not be inserted into the holder 3. This indicates to the user that the cartridge 6 is erroneously inserted upside down.

However, the conventional signal recording or reproduction device has the following problem.

A minicartridge 8 which is smaller than the cartridge 6 proposed by the present applicant in front-to-rear length has recently been proposed by other manufacturers. The minicartridge 8 has enclosed therein a disk which differs in recording or playback specifications from the disk 60 in the cartridge 6 proposed by the present applicant. As indicated in a chain line in FIG. 7, the minicartridge 8 has a rearwardly recessed portion 81 formed in its front end and extending from the midportion thereof toward the right end. Furthermore, the minicartridge 8 has a positioning cavity 68 formed in a front end portion thereof for restraining the cartridge from backlashing laterally. The cavity 68 has an opening in the lower wall of the cartridge and a closed front end.

The disk within the minicartridge 8 is different from the disk 60 in the cartridge 6 in recording or playback specifications and should therefore not be inserted into the holder 3. However, if the minicartridge 8 is inserted into the holder 3 of the conventional device in error, the minicartridge 8 is accommodated in the holder 3, without the likelihood of the recessed portion 81 reaching the misinsertion preventing projection 31. Thus, the minicartridge 8 is undesirably inserted into the holder 3 despite the provision of the projection 31.

In view of the above problem, the present applicant has conceived the idea of preventing the minicartridge 8 from being inserted in error by the first fitting pin 5 for determining the position of the cartridge 6 on the chassis 1. Because the recessed portion 81 of the minicartridge 8 is recessed rearward, the minicartridge 8 fails to come into contact with the misinsertion preventing projection 31 positioned at the right end of the holder 3, whereas the minicartridge 8 comes into contact with the first fitting pin 5 on the chassis 1 at the left end of the holder 3. For this reason, an attempt is made to prevent the minicartridge 8 from being inserted into the holder 3 in error by the first fitting pin 5.

An object of the present invention is to prevent cartridges other than the regular cartridge from being inserted into the holder in error by simple means.

SUMMARY OF THE INVENTION

A fitting pin 5 provided on a chassis 1 is fittable into a positioning cutout 61 formed in a front end portion of a cartridge 6 and opened as at 62 on a front side thereof. The fitting pin 5 has a top end positioned below the path L of movement of the upper end of the opening 62 when the cartridge 6 is inserted into a holder 3 and positioned above the point X of intersection of the fitting pin 5 with the path M of movement of the lower surface of the cartridge 6.

Another fitting pin 5 comprises a prop 50 for supporting the lower surface of the cartridge 6, a guide 51 formed on a top of the prop 50 and tapered upward with a decreasing diameter and a misinsertion precluding portion 52 extending upward from a top of the guide 51 and generally orthogonal to the plane of the chassis 1.

The misinsertion precluding portion 52 is positioned on the path M of movement of the lower surface of the cartridge 6 when the cartridge 6 is inserted into the holder 3. The portion 52 has a top end positioned below the path L of movement of an upper end of the opening 62 of the positioning cutout 61 when the cartridge 6 is inserted into the holder 3.

DESCRIPTION OF THE PREFERRED EMBODIMENTS (First Embodiment)

An embodiment of the present invention will be described below in detail with reference to the drawings concerned.

Figure 1:
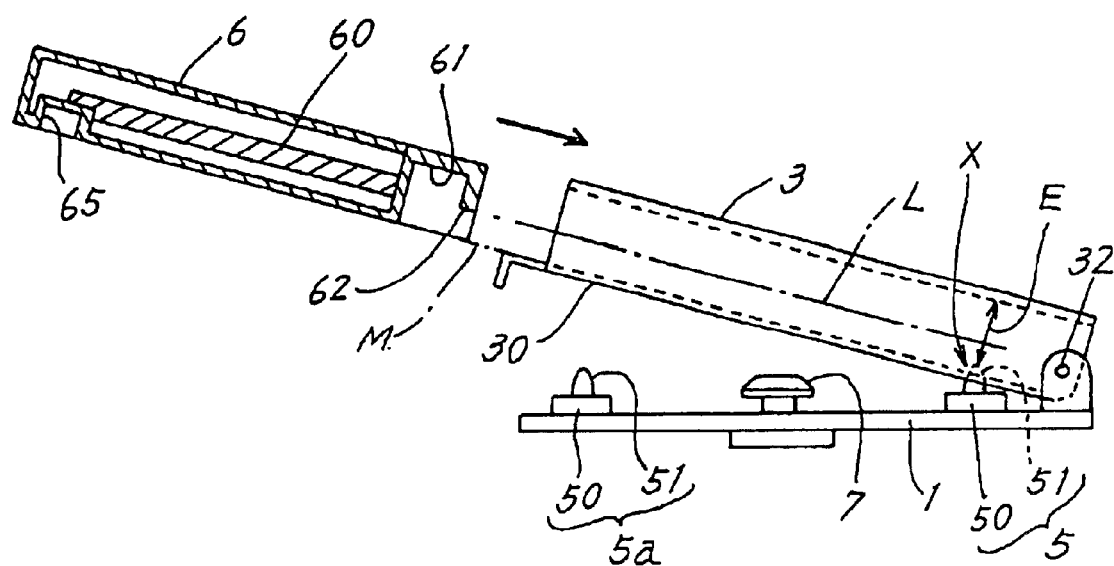
FIG. 1 is a side elevation of a disk recording or playback device.
Figure 4A:
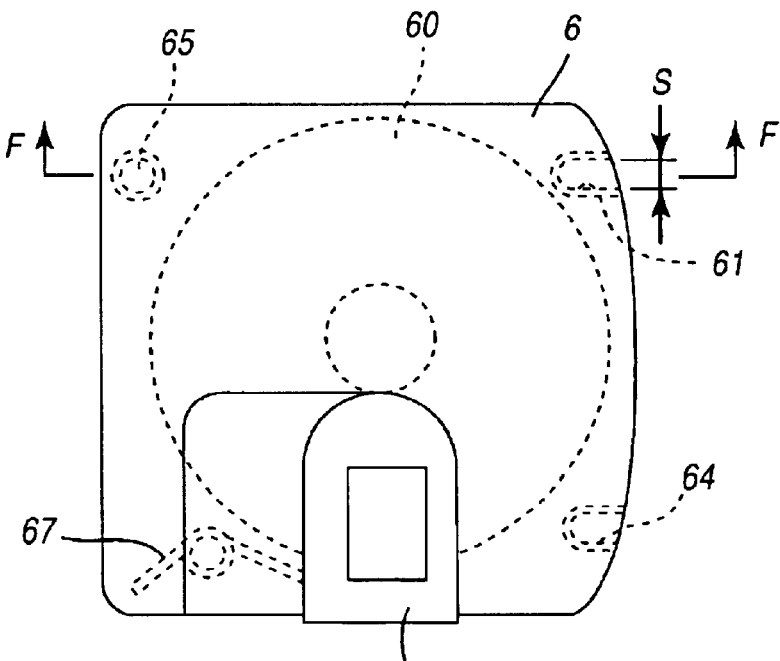
FIGS. 4A and 4B are respectively a plan view and a side elevation of a cartridge previously proposed by the present applicant.
Figure 4B:
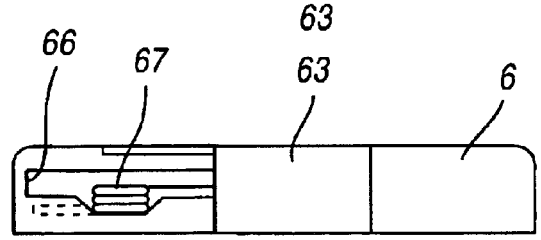
Figure 5:
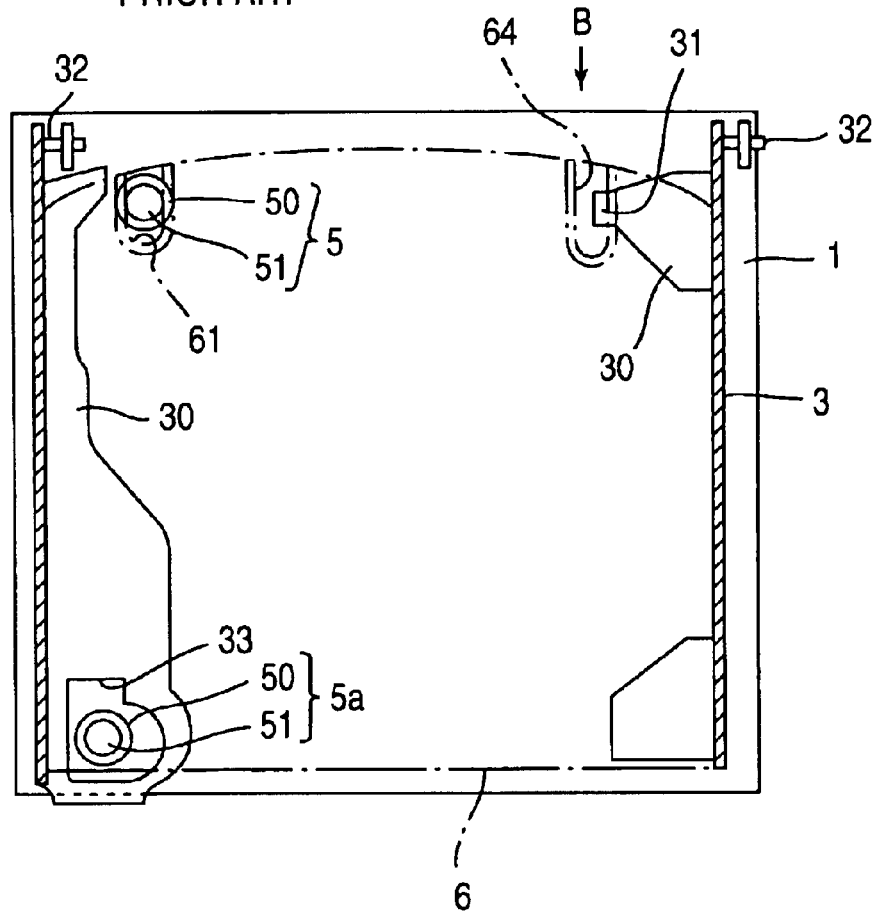
FIG. 5 is a plan view in section of a conventional holder.
Figure 6:
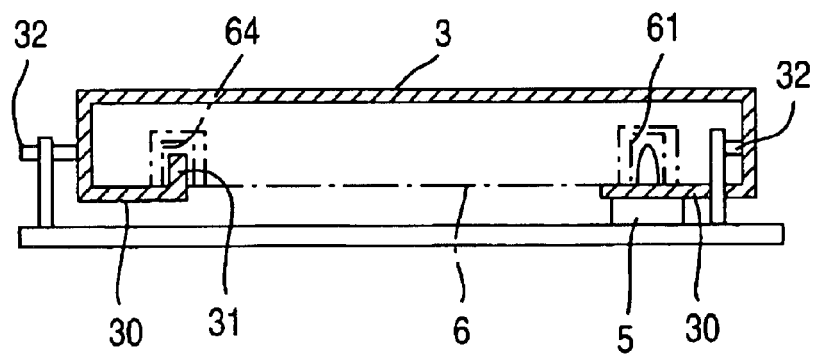
FIG. 6 is a front view of the holder as it is seen from the direction B in FIG. 5.
Figure 7:
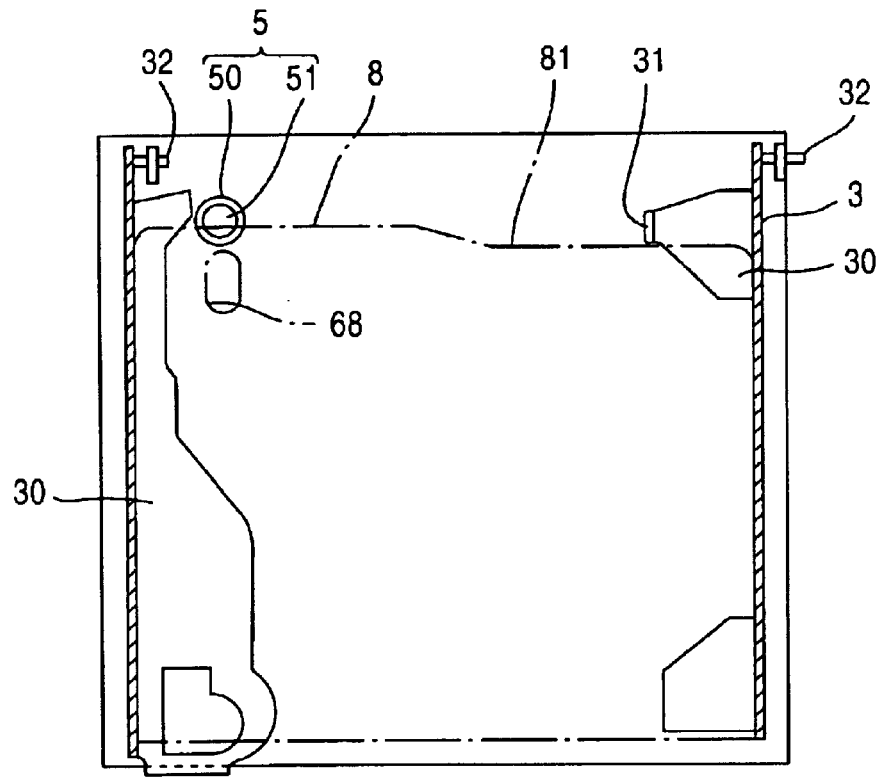
FIG. 7 is a plan view showing the position relationship between a minicartridge and the holder.

FIG. 1 is a side elevation of a disk recording or playback device and shows a holder 3 as raised. The holder 3 has the same shape as in the prior art. A cartridge 6 is shown in section taken along a plane containing the line F—F in FIG. 4. The cartridge 6 has a disk 60 enclosed therein as in the prior art, and is provided at a front end portion thereof with a positioning cutout 61 which is opened on its bottom side and front side as indicated at 62. The cartridge 6 has at a rear end portion thereof a fitting cavity 65 which is opened on its bottom side.

A chassis 1 is provided at its front and rear ends with a first fitting pin 5 and a second fitting pin 5a fittable into the positioning cutout 61 and the fitting cavity 65, respectively. Each of the pins 5, 5a comprises a solid cylindrical prop 50 for supporting the bottom wall of the cartridge 6 and a conical guide 51 projecting from the top of the prop 50 as in the prior art. The positioning cutout 61 has a width which is slightly smaller than the diameter of lower end of the guide 51, whereby the cartridge 6 as fitted to the guide 51 is prevented from backlashing laterally.

In the present embodiment, the first fitting pin 5 prevents erroneous insertion of the minicartridge 8. Stated more specifically with reference to FIG. 1, the top end of the guide 51 of the first pin 5 is positioned below the path L of movement of the upper end of the front opening 62 of the positioning cutout 61 when the cartridge 6 is inserted into the holder 3. Furthermore, the top end of the guide 51 is positioned above the point X of intersection of the first fitting pin 5 with the path M of movement of the lower surface of the cartridge 6 when the cartridge 6 is inserted into the holder 3.

When the regular cartridge 6 or the minicartridge 8 is to be inserted into the holder 3, the minicartridge 8 only is prevented from being inserted by the first pin 5 thus designed as will be described below.

*Insertion of the regular cartridge 6 into the holder 3.

When the cartridge 6 is inserted into the holder 3 as inclined upward, the front opening 62 of the positioning cutout 61 is opposed to the first fitting pin 5. Because the top end of the pin 5 is positioned below the path L of movement of the upper end of the opening 62, the first pin 5 does not interfere with the insertion of the cartridge 6 but is fitted into the cutout 61.

*Erroneous insertion of the minicartridge 8 into the holder 8.

When the minicartridge 8 is inserted into the upwardly inclined holder 3 in error, the minicartridge 8 is blocked by the first pin 5 because the positioning cavity 68 of the minicartridge 8 has a closed front end and further because the top end of the pin 5 is positioned above the point X of intersection of the pin 5 with the path M of movement of the lower surface of the cartridge. Thus, the likelihood of the minicartridge 8 being inserted into the holder 8 in error is effectively obviated merely by giving the first pin 5 such a height as described above.

Figure 8:
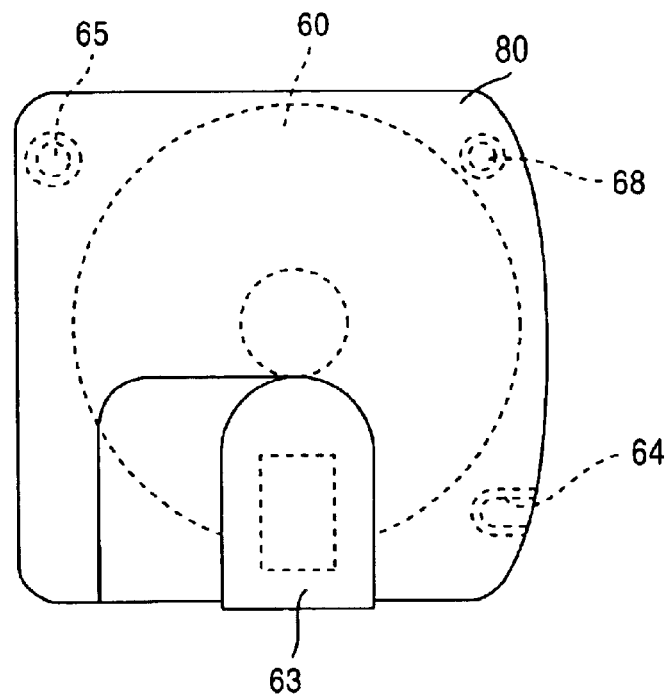
FIG. 8 is a plan view of a thin cartridge.

The cartridge 6 which has a thickness of several millimeters will be referred to as the "regular cartridge." The regular cartridge 6 is accommodated in the holder 3 with diminished upward or downward backlashes. However, it appears likely that aside from the minicartridge 8, a thin cartridge 80 which is about 1 mm smaller than the regular cartridge 6 in thickness and which has approximately the same external size as the cartridge 6 as shown in FIG. 8 will be made commercially available. The thin cartridge 80 should not be inserted into the holder 3 but can be accommodated in the holder 3 because this cartridge 80 has a smaller thickness than the regular cartridge 6. Like the minicartridge 8, the thin cartridge 80 has a positioning cavity 68 with a closed front end.

To prevent the insertion of the thin cartridge 80 into the holder 3, the shortest distance E from the top end of the first fitting pin 5 to the rear surface of top plate of the holder 3 is made smaller than the thickness of the cartridge 80 according to the present embodiment as shown in FIG. 1. Consequently, even if an attempt is made to insert the thin cartridge 80 into the holder 3, the cartridge is caught by the fitting pin 5 and is prevented from being inserted.

Figure 2:
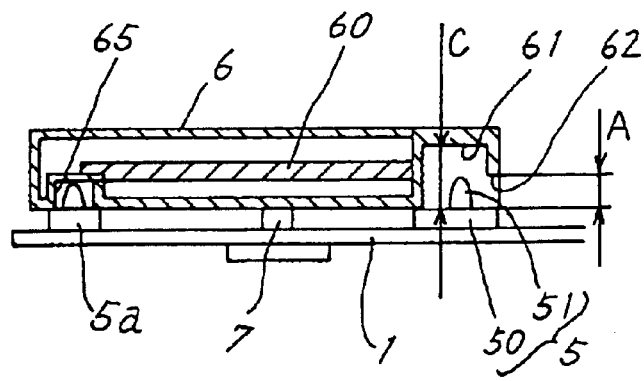
FIG. 2 is a side elevation showing a cartridge as placed on props of fitting pins.

The shortest distance E from the top end of the fitting pin 5 to the rear surface of top plate of the holder 3 is made smaller than the thickness of the cartridge 80, and the pin 5 is further given the following height. FIG. 2 is a side elevation showing the cartridge 6 as placed on the props 50, 50 of the first and second fitting pins 5, 5a. Because the pin 5 is accommodated in the positioning cutout 61, the height C from the lower surface of the cartridge 6 to the inner surface of upper wall of the cartridge 6 defining the cutout 61 is greater than the height of the guide 51 of the pin 5. Further the guide 51 is higher than the height A of the front opening 62 of the cutout 61 as measured from the lower surface of the cartridge 6 to the opening upper end.

With the device of the present embodiment, a misinsertion preventing projection 31 prevents insertion of the cartridge 6 into the holder 3 if the cartridge 6 is inserted upside down. However, even if the projection 31 is absent, the positioning cutout 61 will face upward if the cartridge 6 is turned upside down, with the result that the front end of the cartridge 6 strikes against the guide 51, whereby the cartridge 6 is prevented from being inserted to a full extent.

In summary, the fitting pin 5 of this embodiment prevents the erroneous insertion into the holder 3 of the cartridge 6 as turned upside down, and the erroneous insertion of the minicartridge 8 and the thin cartridge 80 into the holder 3. Thus, the erroneous insertion of the three kinds of cartridges can be effectively prevented by simple means.

Although the insertion of the minicartridge 8 and the thin cartridge 80 can be prevented by the means described above, the insertion of an extraneous article or matter resembling the minicartridge 8 or thin cartridge 80 can also be prevented effectively.

(Second Embodiment)

The present applicant has found the following problem with the device described such that when the regular cartridge 6 facing toward a wrong direction is forced in, the cartridge 6 is inserted as it is into the holder 3.

Figure 9:
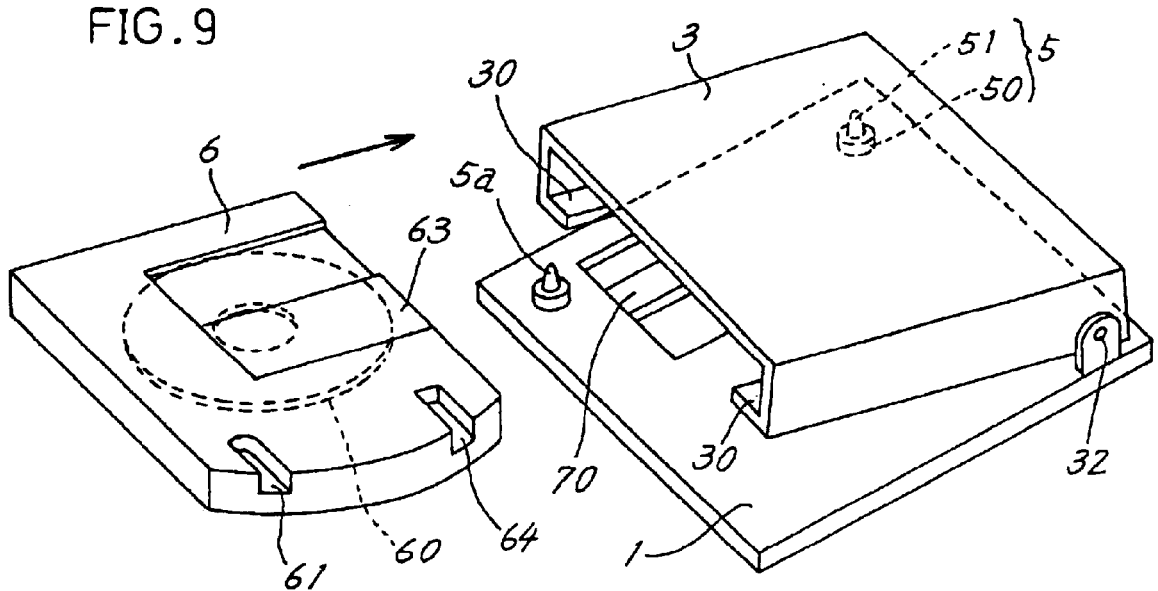
FIG. 9 is a perspective view of a cartridge when it is to be inserted in a wrong posture into the conventional device.
Figure 10:
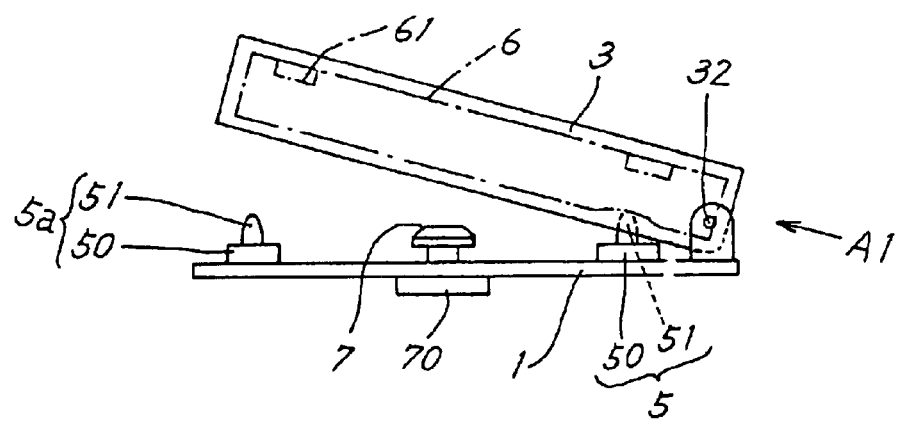
FIG. 10 is a side elevation of the cartridge when it is inserted in the wrong posture into the conventional device.
Figure 11:
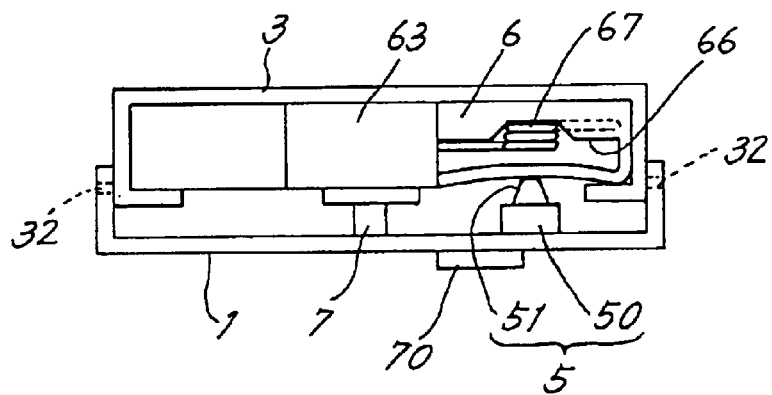
FIG. 11 is a view showing the device as it is seen from the direction A1 in FIG. 10.

FIG. 9 is a perspective view showing the cartridge 6 facing toward a wrong direction when it is to be inserted into the holder 3 as opened, FIG. 10 is a side elevation of the same, and FIG. 11 is a view showing the cartridge as it is seen from the direction A1 in FIG. 10. The cartridge 6 is shown in FIG. 9 as upside down, with the positioning cutout 61 facing toward the right, when the cartridge in this wrong posture is to be inserted into the holder 3. In this case, the opening 66 faces toward the front (see FIG. 11), and when the cartridge 6 is inserted into the holder 3, the forward end of the cartridge 6 comes into contact with the guide 51 of the first pin 5. If the cartridge 6 is forced in this posture into the holder 3, the lower wall of the cartridge 6 is warped upward by being pushed upward by contact with the guide 51 as shown in FIGS. 10 and 11 since the guide 51 is tapered. The cartridge 6 is placed into the holder 3, with the lower wall of the cartridge 6 pushed up by the top end of the guide 51. Thus, the cartridge 6 in the wrong posture is accommodated as it is in the holder 3.

The cartridge in this state is not usable correctly for the recording or reproduction of signals. Additionally, the cartridge 6 cannot be withdrawn from the holder 3 because of the friction between the lower surface of the cartridge 6 and the guide 51. The first fitting pin 5 is shaped as described below in order to completely eliminate the likelihood that the cartridge 6 will be inserted in a wrong position.

Figure 12:
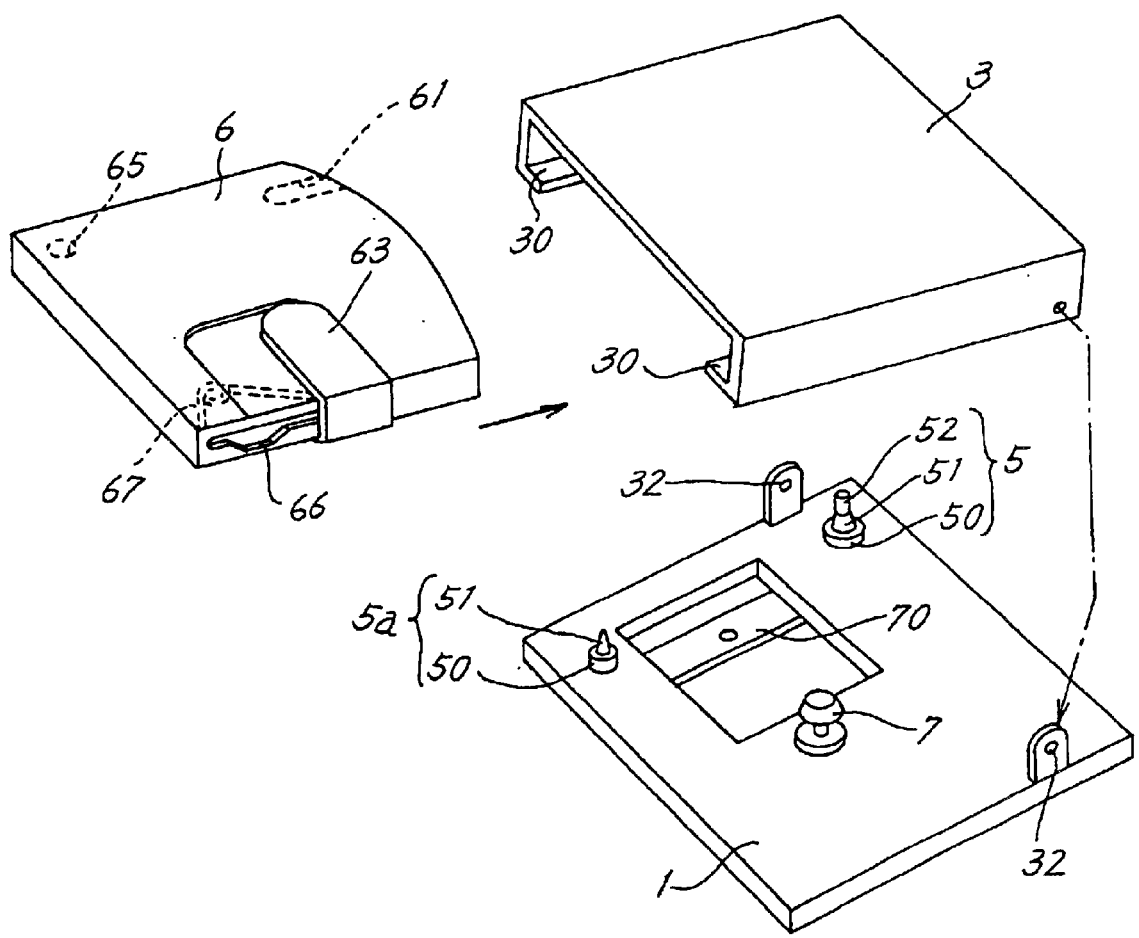
FIG. 12 is a perspective view of a disk recording or playback device having a different first fitting pin.
Figure 13:
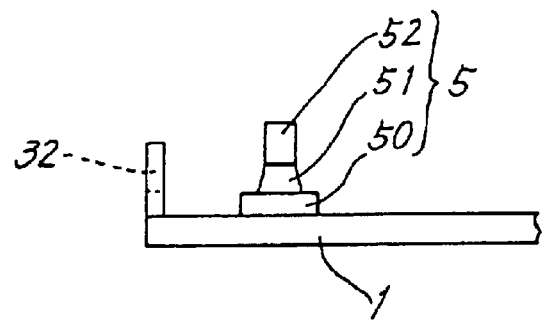
FIG. 13 is a front view of the different first fitting pin.

FIG. 12 is a perspective view of a disk recording or playback device having a first fitting pin 5 according to the present embodiment. FIG. 13 is a front view showing this pin 5 on an enlarged scale.

Figure 3:
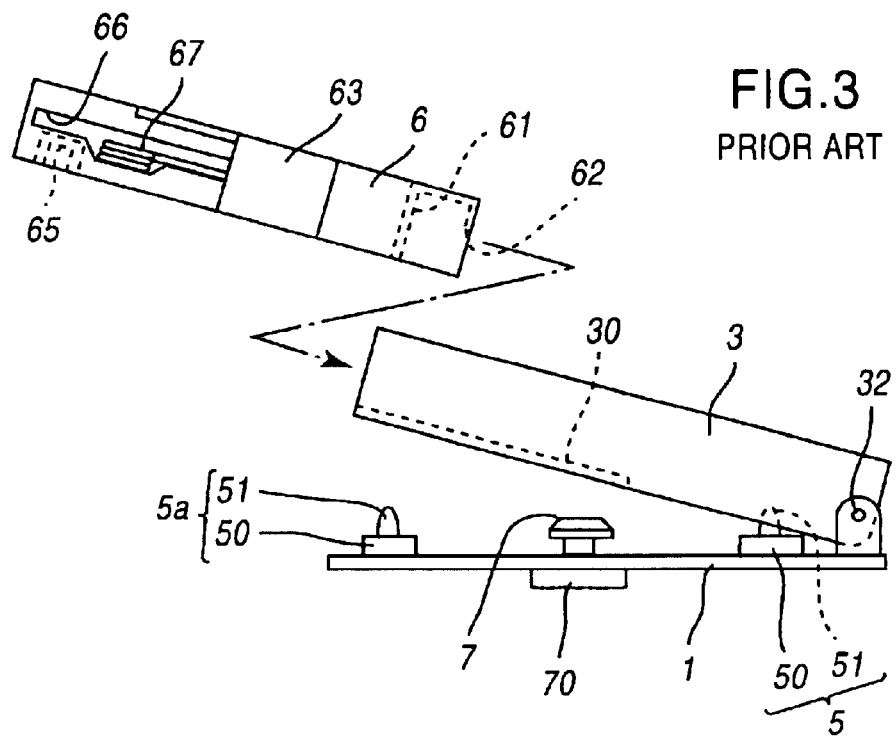
FIG. 3 is a side elevation of a conventional disk recording or playback device.

The first fitting pin 5 comprises a prop 50 for supporting the lower surface of the cartridge 6, a guide 51 formed on the top of the prop 50 and tapered upward with a decreasing diameter and a misinsertion precluding portion 52 extending upward from the top of the guide 51, generally orthogonal to the plane of the chassis 1 and having a flat top end. The misinsertion precluding portion 52 is in the form of a round pin. FIG. 12 shows a second fitting pin 5a, which has the same shape as in the prior art (see FIG. 3) and comprises a prop 50 and a guide 51.

Figure 14:
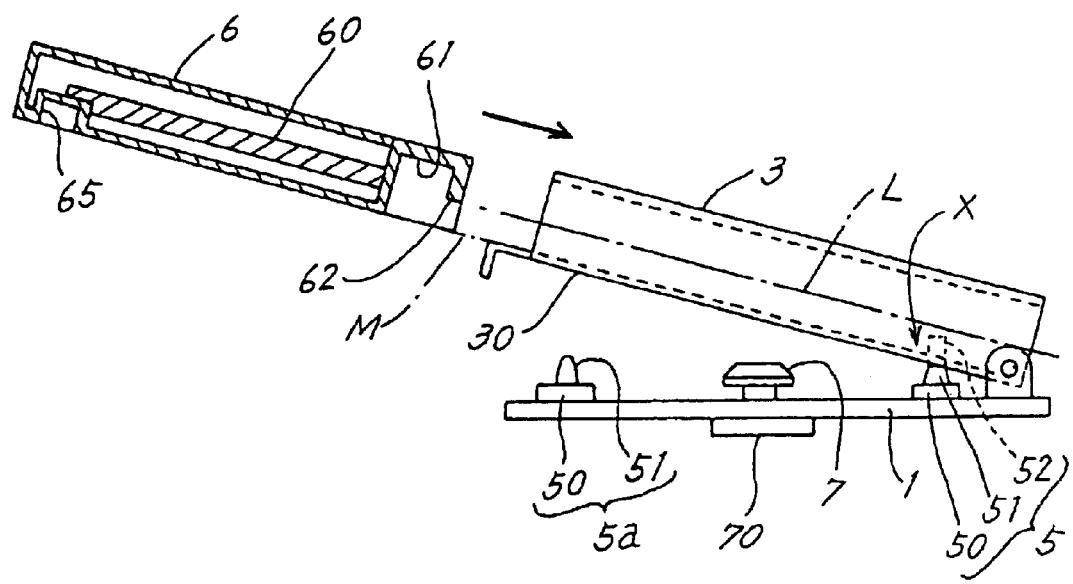
FIG. 14 is a side elevation showing a cartridge as it is to be inserted into a holder as raised, in a regular specified state.

FIG. 14 is a side elevation showing the cartridge 6 to be inserted in the proper state into the holder 3 as raised. The cartridge 6 is shown in section along a plane containing the line F—F in FIG. 4A. The positioning cutout 61 is opened as indicated at 62 on the bottom side and front side, and the path of movement of the upper end of the front opening 62 is indicated at L. With the holder 3 in its raised position, the top end of the misinsertion precluding portion 52 is positioned below the path L of movement of the upper end of the front opening 62. The portion 52 does not interfere with the advance of the cartridge 6, as inserted in the proper posture, into the holder 3. The misinsertion precluding portion 52 is positioned on the path M of movement of the lower surface of the cartridge 6 when the cartridge 6 is inserted into the holder 3.

*Proper insertion of the cartridge

When the cartridge 6 is inserted in the proper posture, the misinsertion precluding portion 52 does not interfere with the advance of the cartridge 6, so that the first fitting pin 5 is positioned into the cutout 61. The width of the positioning cutout 61 is approximately equal to the diameter of the lower end of the guide 51 as in the prior art. This restrains the guide 51 fitting to the guide 51 from producing lateral backlash.

*Erroneous insertion of the cartridge

Figure 15:
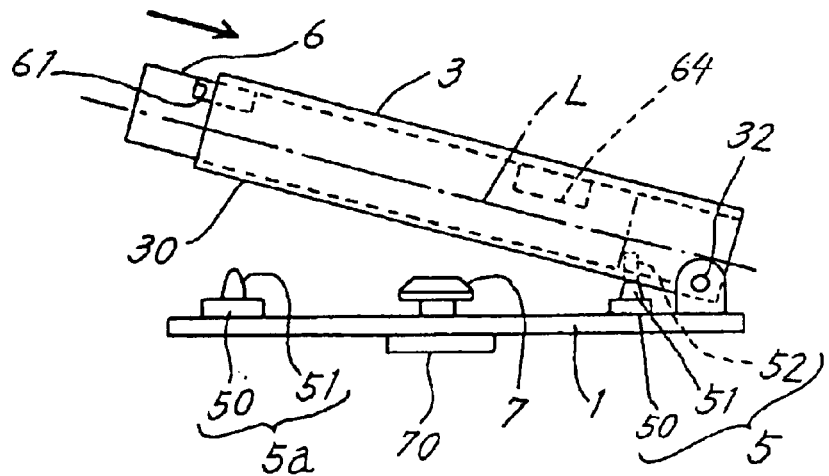
FIG. 15 is a side elevation showing a cartridge facing toward a wrong direction when it is to be inserted into the raised holder.

FIG. 15 is a side elevation showing the cartridge 6 facing toward a wrong direction when the cartridge is to be inserted into the holder 3 as raised. As shown in FIG. 9, the cartridge 9 is turned upside down, with the positioning cutout 61 facing toward the right.

The misinsertion precluding portion 52 is positioned on the path M of movement of the lower surface of the cartridge 6, so that when inserted into the holder 3, the cartridge 6 has its lower end brought into contact with the precluding portion 52. Because the portion 52 is in the form of a round pin, the contact of the cartridge lower end with this portion 52 does not warp the bottom wall of the cartridge 6 upward. Consequently, even if the cartridge 6 is forced into the holder 3, the bottom wall of the cartridge 6 can be prevented from riding onto the first fitting pin 5. Thus, the cartridge 6 is precluded from being inserted into the holder 3 to a full extent, enabling the user to recognize the misinsertion of the cartridge 6.

If the cartridge 6 is inserted into the holder 3, as turned upside down with the positioning cutout 61 facing rightward, the insertion is restricted by the precluding portion 52. Even if the cartridge 6 is inserted in other wrong position, the forward end of the cartridge 6 comes into striking contact with the precluding portion 52, whereby the insertion of the cartridge in the wrong posture is precluded. With the portion 52 thus failing to fit into the positioning cutout 61, the insertion of the cartridge 6 into the holder 3 is interrupted.

Figure 16:
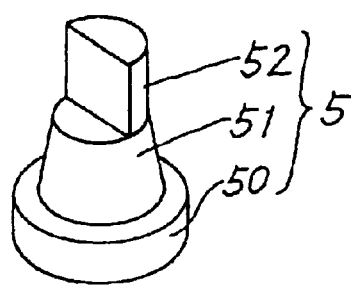
FIG. 16 is a perspective view showing another first fitting pin.
Figure 17:
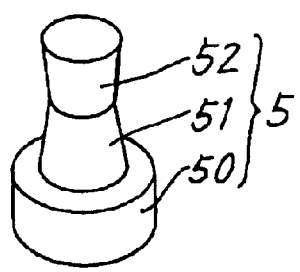
FIG. 17 is a perspective view showing an undesirable first fitting pin.

The misinsertion precluding portion 52 is in the form of a round pin according to the above embodiment, whereas the portion 52 may be a protective wall extending upright from the top of the guide 51 as seen in FIG. 16. However, if the precluding portion 52 is tapered downward with a decreasing diameter as shown in FIG. 17, the positioning cutout 61 encounters difficulty in fitting around the portion 52, which is therefore undesirable.

According to the present invention, the front opening 62 of the positioning cutout 61 is opposed to the fitting pin 5 when the cartridge 6 is inserted into the holder 3 as inclined upward. Because the top end of the fitting pin 5 is positioned below the path L of movement of the upper end of the front opening 62, the pin 5 fits into the cutout 61 without interfering with the insertion of the cartridge 6.

Suppose the minicartridge 8 is inserted in error into the holder 3 as inclined upward. The positioning cutout 61 of the minicartridge 8 is closed at its front end, and the top end of the fitting pin 5 is positioned above the point X of intersection of the pin 5 with the path M of movement of the cartridge lower surface. The minicartridge 8 is therefore prevented from being inserted by the pin 5. Thus, the erroneous insertion of the minicartridge 8 can be effectively prevented merely by determining the height of the fitting pin 5 as described above.

According to the present invention, the misinsertion precluding portion 52 is positioned on the path M of movement of lower surface of the cartridge 6, so that the lower end of the cartridge 6 comes into contact with the precluding portion 52 if the cartridge 6 is inserted in a wrong posture, i.e., as turned upside down, with the positioning cutout 61 directed sideways (see FIG. 9). Because the portion 52 extends upward substantially orthogonal to the plane of the chassis 1, the bottom wall of the cartridge 6 will not be warped upward by contact with the precluding portion 52. The cartridge 6 can therefore be prevented from riding onto the fitting pin 5. Thus, even if the cartridge 6 is erroneously inserted into the holder 3 in any way, the cartridge 6 can be prevented from being loaded as it is into the holder 3.

What is claimed is:

1. A device for accommodating a cartridge comprising a holder supported at one end thereof by a pivot on a chassis and positionable as inclined upward with respect to the chassis for the cartridge to be inserted thereinto, a fitting pin being fixed to the chassis and fittable into a positioning cutout formed in a front end portion of the cartridge, the cutout being opened at an opening on a front side thereof and at a bottom side thereof, wherein the fitting pin has a top end positioned below the path L of movement of an upper end of the front opening when the cartridge is inserted into the holder and positioned above the point X of intersection of the fitting pin with the path M of movement of a lower surface of the cartridge, wherein the cartridge which is of the regular type is insertable into the holder with diminished upward or downward backlash, and a thin cartridge having a smaller thickness than the regular cartridge is also insertable into the holder, and the shortest distance E from the top end of the fitting pin to a top wall of the holder is made smaller than the thickness of the thin cartridge.

2. A device for accommodating a cartridge comprising a holder supported at one end thereof by a pivot on a chassis and positionable as inclined upward with respect to the chassis for the cartridge to be inserted thereinto, a fitting pin being provided on the chassis and fittable into a positioning cutout formed in a front end portion of the cartridge, the cutout being opened at an opening on a front side thereof and a bottom side thereof, the cartridge accommodating device being characterized in that the fitting pin comprises a prop for supporting a lower surface of the cartridge, a guide formed on a top of the prop and tapered upward with a decreasing diameter and a misinsertion precluding portion extending upward from a top of the guide and generally orthogonal to the plane of the chassis, the misinsertion precluding portion being positioned on the path M of movement of the lower surface of the cartridge when the cartridge is inserted into the holder and having a top end positioned below the path L of movement of an upper end of the front opening when the cartridge is inserted into the holder.

3. A cartridge accommodating device according to claim 2 wherein the misinsertion precluding portion is a round pin or protective wall integral with the guide.

* * * * *